(12) United States Patent
Wolfsberger

(10) Patent No.: US 10,300,676 B2
(45) Date of Patent: May 28, 2019

(54) SANDWICH COMPONENT

(71) Applicant: MAGNA STEYR Fahrzeugtechnik AG & Co KG, Graz (AT)

(72) Inventor: Guenter Wolfsberger, Lieboch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 9 days.

(21) Appl. No.: 14/978,813

(22) Filed: Dec. 22, 2015

(65) Prior Publication Data

US 2016/0176157 A1 Jun. 23, 2016

(30) Foreign Application Priority Data

Dec. 22, 2014 (EP) .................................... 14199861

(51) Int. Cl.
| | | |
|---|---|---|
| *B32B 3/12* | (2006.01) | |
| *B32B 3/28* | (2006.01) | |
| *B32B 5/18* | (2006.01) | |
| *B32B 5/26* | (2006.01) | |
| *B32B 5/32* | (2006.01) | |
| *B32B 27/04* | (2006.01) | |
| *B32B 27/40* | (2006.01) | |

(52) U.S. Cl.
CPC .................. *B32B 5/26* (2013.01); *B32B 3/12* (2013.01); *B32B 3/28* (2013.01); *B32B 5/18* (2013.01); *B32B 5/32* (2013.01); *B32B 27/04* (2013.01); *B32B 27/40* (2013.01); *B32B 2260/023* (2013.01); *B32B 2260/046* (2013.01); *B32B 2605/08* (2013.01)

(58) Field of Classification Search
CPC .................................... B32B 5/26; B32B 3/12
See application file for complete search history.

(56) References Cited

U.S. PATENT DOCUMENTS

| | | | |
|---|---|---|---|
| 4,294,329 A | * | 10/1981 | Rose ......................... B32B 3/12 181/222 |
| 5,460,865 A | | 10/1995 | Tsotsis |
| 7,186,310 B2 | | 3/2007 | Yamaguchi et al. |
| 7,892,379 B2 | | 2/2011 | Eleazer et al. |

(Continued)

FOREIGN PATENT DOCUMENTS

| | | |
|---|---|---|
| CN | 101977954 A | 2/2011 |
| DE | 102010004865 A | 7/2011 |

(Continued)

OTHER PUBLICATIONS

Office Action for Korean Patent Application No. 10-2015-0182582, dated Feb. 28, 2017, 13 pages including 6 pages of English translation.

(Continued)

*Primary Examiner* — Liam J Heincer
(74) *Attorney, Agent, or Firm* — Jordan IP Law, LLC; Todd A. Vaughn

(57) ABSTRACT

A sandwich component for a motor vehicle includes a core layer, at least two fiber layers, and at least one layer of matrix material applied onto the upper and/or lower side of at least one of the fiber layers. The matrix material is applied in different ways onto at least two of the fiber layers and/or in different ways onto at least one of the fiber layers along the upper and/or lower side thereof.

19 Claims, 2 Drawing Sheets

(56) References Cited

U.S. PATENT DOCUMENTS

| | | | | |
|---|---|---|---|---|
| 2003/0207116 A1* | 11/2003 | Franken | ............... | B32B 3/12 428/411.1 |
| 2006/0051595 A1* | 3/2006 | Gaudeus | ............... | B32B 7/12 428/423.1 |
| 2007/0090162 A1* | 4/2007 | Verhaeghe | ............ | B29C 70/52 228/101 |
| 2008/0131645 A1* | 6/2008 | Horigome | ............. | B32B 3/12 428/73 |
| 2008/0160860 A1* | 7/2008 | Kuroki | ............... | B32B 5/022 442/370 |
| 2009/0025861 A1* | 1/2009 | Eleazer | .............. | B32B 5/26 156/182 |
| 2009/0252920 A1* | 10/2009 | Khan | .................. | B32B 3/12 428/116 |
| 2010/0198321 A1* | 8/2010 | Moeck | ................. | A47G 9/0215 607/107 |
| 2011/0014480 A1* | 1/2011 | Fader | ................. | B29C 70/086 428/423.1 |
| 2012/0177861 A1* | 7/2012 | Eleazer | ............... | B32B 5/022 428/56 |
| 2013/0000826 A1* | 1/2013 | Katz | ................. | B29B 17/0042 156/196 |
| 2013/0209723 A1* | 8/2013 | Muller | ................. | B29C 44/06 428/86 |
| 2013/0243998 A1* | 9/2013 | Preuss | ................. | B29C 70/865 428/116 |
| 2013/0280469 A1* | 10/2013 | Preisler | ............... | B32B 3/04 428/73 |
| 2014/0227928 A1* | 8/2014 | Ehbing | ................ | B32B 7/02 442/328 |
| 2014/0329084 A1* | 11/2014 | Poncet | ................ | C08G 18/302 428/341 |
| 2015/0128836 A1* | 5/2015 | Verhaeghe | ............ | D05C 15/22 112/167 |
| 2015/0132532 A1* | 5/2015 | Preisler | ............... | B32B 27/065 428/85 |
| 2015/0210035 A1* | 7/2015 | Rippel | ................. | B32B 5/18 428/213 |
| 2015/0239200 A1* | 8/2015 | Bartolome | ............. | B32B 3/12 428/118 |
| 2015/0300019 A1* | 10/2015 | Li | ..................... | B32B 5/024 428/188 |
| 2016/0176178 A1* | 6/2016 | Wolfsberger | ....... | B32B 37/1284 156/324 |
| 2016/0214518 A1* | 7/2016 | Ter Steeg | ............ | B29C 70/30 |
| 2016/0361889 A1* | 12/2016 | Bartolome | ............ | B32B 3/12 |

FOREIGN PATENT DOCUMENTS

| | | | |
|---|---|---|---|
| DE | 102012220305 | A1 | 5/2014 |
| EP | 1055513 | A1 | 11/2000 |
| JP | S56-115235 | A | 9/1981 |
| JP | S56115235 | A | 9/1981 |
| JP | S61-040164 | A | 2/1986 |
| JP | H08-025563 | A | 1/1996 |
| JP | H0825563 | A | 1/1996 |
| JP | 2000-515823 | A | 11/2000 |
| JP | 2000515823 | A | 11/2000 |
| JP | 3368999 | B2 | 1/2003 |
| JP | 20050042219 | A | 5/2005 |
| JP | 2008137203 | A | 6/2008 |
| JP | 2012-006175 | A | 1/2012 |
| KR | 10-2011-0007116 | A | 1/2011 |
| RU | 2341546 | C2 | 12/2008 |
| WO | 03/037619 | A1 | 5/2003 |

OTHER PUBLICATIONS

Office Action for Japanese Patent Application No. 2015-248216, dated Nov. 1, 2016, 6 pages including 3 pages of English translation.

Office Action for Chinese Patent Application No. 201510415284.5, dated Sep. 4, 2017, 10 pages including 6 pages of English translation.

Office Action for Korean Patent Application No. 10-2015-0182582, dated Sep. 20, 2017, 11 pages including 5 pages of English translation.

Notice of Reasons for Rejection for Japanese Patent Application 2015-248216, dated Oct. 9, 2018, 13 pages including 7 pages of English translation.

Office Action for Chinese Patent Application No. 201510415284.5, dated Nov. 27, 2018, 9 pages including 5 pages of English translation.

Office Action for Korean Patent Application No. 10-2015-0182582, dated May 14, 2018, 9 pages including 2 pages of English translation.

* cited by examiner

SANDWICH COMPONENT

CROSS-REFERENCE TO RELATED APPLICATIONS

The present application claims priority 35 U.S.C. § 119 to European Patent Publication No. EP14199861.7 (filed on Dec. 22, 2014), which is hereby incorporated by reference in its entirety.

TECHNICAL FIELD

Embodiments relate to a sandwich component, in particular, for use in a motor vehicle.

BACKGROUND

A sandwich component should be generally understood as meaning a component that is made up of layers of the same material or different materials. In the simplest case, sandwich components consist of two cover layers, an upper cover layer and a lower cover layer, as well as a core layer, which is arranged between the upper cover layer and the lower cover layer. The cover layers are configured in the manner of fibres and/or woven fabrics and may be penetrated by an adhesive-like matrix material. An ultimate connection between the individual layers usually takes place by pressing by way of a suitable tool, such as for example a press.

Such sandwich components are used in many different areas. In recent years, however, their importance particularly as a structural component in the area of lightweight automotive construction has increased enormously.

The prior art discloses many different approaches to the production of structural components.

In order for a durable connection between the upper and lower cover layers and the core layer to be achieved, matrices, in particular adhesive-type resins, are used which during pressing of the cover layers and the core layer are squeezed through the cover layers and in this way produce a connection between the cover layers and the core layer. The application of the matrix material here is performed only from the outside onto the outermost cover layer. Typically, an excessive amount of matrix material is applied here, in order to ensure reliable penetration of the cover layers with matrix material when the individual layers are pressed.

In the manufacture of a sandwich component according to a method which has been briefly described above the disadvantage arises that only one type of matrix material (in terms of composition and application thickness) may be applied onto the outermost cover layer. Moreover, depending on the viscosity of the matrix material and the permeability of the cover layer, the matrix material may ingress too deeply into the core layer and penetrate the core layer in an unchecked manner. In order to prevent this, according to the prior art a barrier layer which is impermeable to the matrix material is often disposed between the cover layer and the core layer. However, this barrier layer in most cases has to be adhesively bonded to the core layer in a separate operational procedure.

SUMMARY

Embodiments relate to an improved sandwich component which, with respect to a requirement of meeting the most varied technical and optical requirements, is designed so as to be simple and cost-effective.

In accordance with embodiments, a sandwich component comprises at least one of: at least one core layer and at least two fibre layers, wherein at least one matrix material is applied onto the upper side and/or the lower side of at least one of the fibre layers, wherein matrix material is applied in different ways onto at least two of the fibre layers and/or matrix material is applied in different ways onto at least one of the fibre layers along the upper and/or lower side thereof.

In accordance with embodiments, a sandwich component for a motor vehicle comprises: at least one core layer; at least two fibre layers; and at least one layer of a matrix material applied onto an upper side and/or a lower side of at least one of the fibre layers, wherein each layer of the matrix material is applied in a different manner onto at least one of the fibre layers.

In accordance with embodiments, a sandwich component for a motor vehicle, comprises: at least one core layer; at least two fibre layers; and at least one layer of matrix material applied onto an upper side and/or a lower side of at least one of the fibre layers, wherein each layer of the matrix material is applied in a different manner from each other.

In accordance with embodiments, a sandwich component for a motor vehicle comprises: a core layer; a plurality of fibre layers over the core layer; and a layer of matrix material between adjacent fibre layers and between one of the fibre layers and the core layer, wherein each layer of the matrix material is applied in a different manner from each other.

Advantageous refinements of the invention can be derived from the dependent patent claims.

The sandwich component in accordance with embodiments comprises a core layer and at least two fibre layers. In accordance with embodiments, the fibre layers are disposed on the upper and/or lower side of the core layer.

In accordance with embodiments, at least one matrix material is applied onto the upper side and/or the lower side of at least one fibre layer, wherein matrix material is applied in different ways onto at least two fibre layers and/or matrix material is applied in different ways onto at least one fibre layer along the upper and/or lower side.

In accordance with embodiments, the terminology "in different ways" describes that the matrix material is applied in different amounts and/or in different types of matrix material onto the fibre layers.

In accordance with embodiments, the matrix material is advantageously applied homogeneously and/or in-homogeneously onto one or a plurality of material webs. This results in the advantage that a respective matrix material is applied on at least one respective fibre layer in a manner which is individually adapted in each case to each fibre layer, so as to correspond to the functional requirements of the sandwich component, such as, for example, partially different zonal/regional rigidities and surface qualities. The application of the matrix material onto the respective fibre layer here may be homogeneously or in-homogeneously performed, and thus, regions/zones having different matrix-material constructions may be configured along the face of the sandwich component, for example.

Furthermore, because of the individual application (in various ways) of the matrix material onto the individual webs of material, as well as the adaptation of the properties of the matrix material (for example viscosity, thixotropy, amount) to the respective material of the material webs, only a comparatively thin matrix application is required in each case, resulting in optimization in terms of weight and function.

In accordance with embodiments, the at least two fibre layers are disposed on one side of the core layer.

In accordance with embodiments, the fibre layers are made from a fibrous material, and are designed so as to be thin in comparison with the core layer. The fibres used thereby are natural fibres, such as, for example, hemp fibres, bamboo fibres, cellulose-based fibres, etc., and/or organic and inorganic man-made fibres, such as, for example, polyamide fibres, glass fibres, carbon fibres, etc.

The fibrous material is thus constructed of fibres that have been processed into woven, non-woven or knitted fabrics, mats, meshes, etc., wherein these formations have preferably been further processed into a basic matrix suited to respective requirements, to form what are known as composite materials.

In a method in accordance with embodiments, the fibre layers (of a fibrous material) are pretreated, wherein in this case all manners of pre-treatment that are familiar to a person skilled in the art, such as, for example, priming, impregnating, coating, etc., may be considered. The individual fibre layers which are used may differ from one another in their (basic) composition and design (shape).

In accordance with embodiments, the fibre layers may be configured as (fibrous-material) webs and/or as pre-tailored individual (fibrous-material) layers which correspond to the contour of the sandwich component.

Advantageously, the fibre layers are configured so as to be permeable to the matrix material.

In accordance with embodiments, the individual fibre layers may be configured so as to be layered, that is to say that they are constructed from at least two individual layers, wherein at least one of the individual layers is a fibrous material.

Individual layers which are composed of a non-fibrous material here are advantageously configured as plastic films.

In accordance with embodiments, the core layer may be configured in the manner of a honeycomb. Other structures and shapes of the core layer, however, such as, for example, an undulated configuration, are not excluded.

In accordance with embodiments, the core layer may be formed from a lightweight material, such as for example a polymer (foam, plastic, rubber, etc.), a cellulose-based material (paper, wood, card, etc.), a composite material or else a metal.

In accordance with embodiments, the core layer may be configured in a layered manner, for example, by a plurality of individual core layers which are arranged on top of one another. For example, at least two individual core layers may be configured so as to be different from one another. Honeycomb cores with different honeycomb shapes, honeycomb sizes, honeycomb alignments, different web geometries and/or materials of the honeycomb and/or individual core layers may be stacked and interconnected. This is especially advantageous because, as a result thereof, the later finished component can be partially provided with different functional properties or component properties, on the one hand, the component is intended to have a specific required strength and rigidity, but, on the other hand, it is intended to contain soft, more easily deformable zones at certain locations, as is advantageous for example, in motor vehicles for avoiding injuries in the event of collisions with pedestrians.

In accordance with embodiments, along the face of the sandwich component zones having different individual core layers, in particular, having different numbers and/or shapes and/or material compositions, are configured.

In accordance with embodiments, the core layer may be configured so as to be permeable to the matrix material, but at least semi-permeable. The matrix material may be of a thermoplastic and/or thermosetting polymer. The matrix material may be a resin, such as, for example, a synthetic resin (polyurethane).

In accordance with embodiments, the matrix material is configured in an adhesive manner and has for example a resin and a catalyst, or a base and a catalyst, as the main components.

In order to influence the properties of the matrix material with respect to diverse requirements, such as for example strength or elasticity, additional components and/or materials, such as for example fibres, are advantageously admixed with the matrix material. This may involve short and/or long fibres being admixed homogeneously or in-homogeneously with the matrix material, in order thereby to apply matrix material to the webs of material in different ways, i.e., homogeneously and/or inhomogeneously. Different component properties, such as, for example, an inhomogeneous and/or homogeneous zonal/regional rigidity over the surface area of the web of material, are thus likewise produced. This results in a sandwich component with a homogeneous and/or inhomogeneous layer structure both over the surface area of the component and over the layer structure of the layers.

In accordance with embodiments, the matrix material may be disposed between the fibre layers, and/or in the intermediate space between one fibre layer and the core layer, and/or externally on the outermost fibre layer.

In accordance with embodiments, a sandwich component may comprise at least one material layer which is not a fibre layer is disposed between the fibre layers, and/or in the intermediate space between one fibre layer and the core layer, and/or outside of the outermost fibre layer.

In accordance with embodiments, the fibre layers, the matrix material, if applicable the material layer, and the core layer are pressed so as to form the sandwich component.

In accordance with embodiments, the sandwich component may be used as a planar component of a motor vehicle, in particular, as a front lid, door, roof, rear hatch, load bed, covering, body floor panel, or torsion box.

DRAWINGS

Embodiments will be illustrated by way of example in the drawings and explained in the description below.

DESCRIPTION

Figure 1:
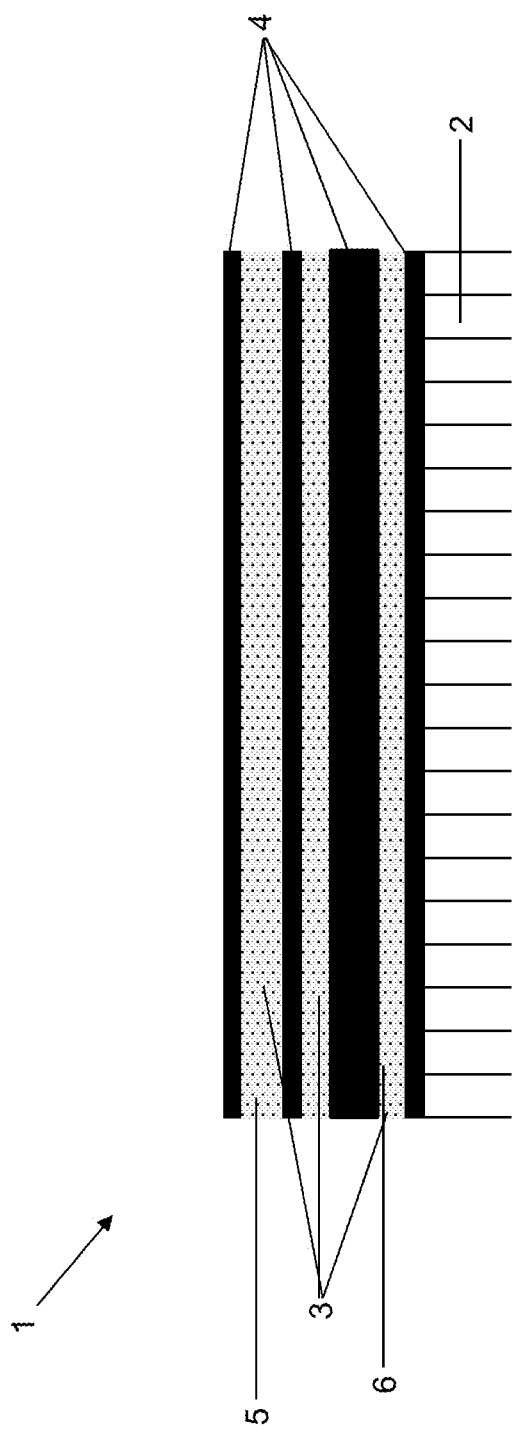
FIG. 1 illustrates a sandwich component, in accordance with embodiments, prior to pressing.
Figure 2:
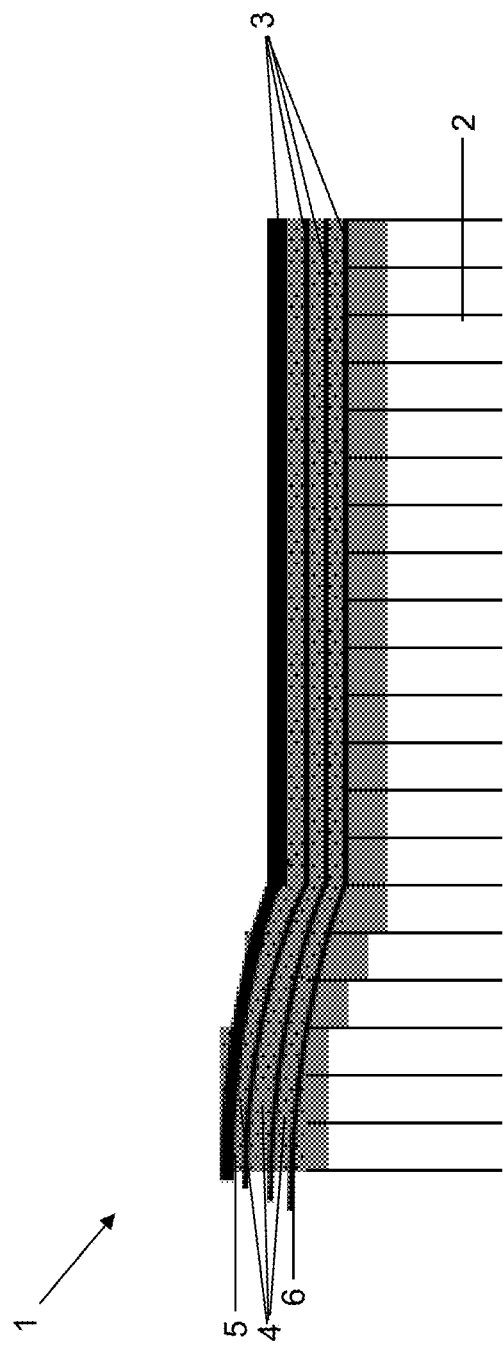
FIG. 2 illustrates a sandwich component, in accordance with embodiments, post pressing.

FIGS. 1 and 2 are schematic illustrations of a sandwich component 1 prior to pressing (FIG. 1) and post pressing (FIG. 2).

As illustrated in FIG. 1, the sandwich component 1 has a core layer 2 and a plurality of fibre layers 3. The fibre layers 3 are disposed on the upper side of the core layer 2. A layer of a matrix material 4 is applied onto the upper side of each of the fibre layers 3. The layer of the matrix material 4 is likewise disposed between the core layer 2 and a lower side of an innermost fibre layer 6. In terms of the amount of matrix material 4 to be applied, for example, more matrix material 4 may be applied onto the upper side of the innermost fibre layer 6 than onto an upper side of an outermost fibre layer 5.

The matrix material 4 to be applied onto the innermost fibre layer 5 and the outermost fibre layer 6 "in different ways," such as, for example, in different amounts. The fibre layers 3 are configured as pre-configured individual layers which correspond to the contour of the sandwich component 1. The core layer 2 is implemented in the manner of a honeycomb and in one part, wherein the honeycombs are open towards the upper side and may receive matrix material 4.

As illustrated in FIG. 2, the sandwich component 1 is shown post pressing. Pressing may be performed by way of a press by the wet-pressing method. The fibre layers 3 are configured so as to be permeable to the matrix material 4, in which by way of pressing the matrix material 4 is squeezed through all fibre layers 3.

On account of the targeted application of matrix material 4 onto the fibre layers 3, the core layer 2 is only slightly impregnated by the matrix material 4, this also ensuring sufficient bonding of the fibre layers 3 to the core layer 2.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Sandwich component
2 Core layer
3 Fibre layer
4 Matrix
5 Outermost fibre layer
6 Innermost fibre layer

What is claimed is:

1. A sandwich component for a motor vehicle, comprising:
   at least one core layer;
   at least two fibre layers including a first fibre layer and a second fibre layer, the first fibre layer being disposed between the second fibre layer and the at least one core layer; and
   a plurality of layers of a matrix material applied onto the at least two fibre layers,
   wherein:
   a first of the layers of the matrix material is disposed between the first fibre layer and the second fibre layer, and includes a first amount of the matrix material,
   a second of the layers of the matrix material is disposed on an outermost one of the at least two fibre layers so as to include at least a portion that is outside of an entire area between the at least two fibre layers,
   the second layer of the matrix material includes a second amount of the matrix material that is less than the first amount of the matrix material, and
   the first layer of the matrix material and the second layer of the matrix material are different types of matrix material.

2. The sandwich component of claim 1, wherein the matrix material comprises fibres.

3. The sandwich component of claim 1, wherein the matrix material comprises polyurethane.

4. The sandwich component of claim 1, wherein the plurality of layers of the matrix material includes:
   a layer disposed in an intermediate space between one of the at least two fibre layers and the at least one core layer.

5. The sandwich component of claim 1, wherein the at least one core layer is formed in the manner of a honeycomb.

6. The sandwich component of claim 1, wherein the at least one core layer is constructed in a layered manner from at least two individual core layers which are stacked on top of one another.

7. The sandwich component of claim 6, wherein the individual core layers with respect to their shape and material composition are configured so as to be different from one another.

8. The sandwich component of claim 6, wherein along a face of the sandwich component, zones having different individual ones of the core layers are configured.

9. The sandwich component of claim 1, wherein the at least one core layer is constructed from a polymer material.

10. The sandwich component of claim 1, wherein the at least one core layer is configured so as to be at least semi-permeable to the matrix material.

11. The sandwich component of claim 1, further comprising at least one material layer, which is not a fibre layer, between the at least two fibre layers, and/or in an intermediate space between one of the at least two fibre layers and the at least one core layer, and/or outside of the outermost one of the at least two fibre layers.

12. The sandwich component of claim 1, wherein the at least two fibre layers, the matrix material and the at least one core layer are pressed so as to form the sandwich component.

13. The sandwich component of claim 1, wherein the at least two fibre layers are configured as webs or as pre-tailored individual layers which correspond to a contour of the sandwich component.

14. The sandwich component of claim 1, wherein:
   the at least two fibre layers includes a third fibre layer that is the outermost one of the at least two fibre layers,
   the second fibre layer is disposed between the third fibre layer and the at least one core layer,
   a third of the layers of the matrix material is between the second fibre layer and the third fibre layer, wherein the first layer of the matrix material is between the third layer of the matrix material and the at least one core layer, and the third layer of the matrix material includes a third amount of the matrix material that is less than the first amount of the matrix material.

15. The sandwich component of claim 14, wherein the third fibre layer has a thickness, as measured in a direction perpendicular to a surface of the at least one core layer in direct contact with the layers of the matrix material, that is greater than that of each of the first and second fibre layers.

16. A sandwich component for a motor vehicle, comprising:
   at least one core layer;
   at least two fibre layers including a first fibre layer and a second fibre layer; and
   a plurality of layers of matrix material applied onto the first fibre layer and the second fibre layer,
   wherein:
      a first of the layers of the matrix material is in direct contact with each of the first fibre layer and the second fibre layer such that the second fibre layer is disposed between the first layer of the matrix material and the at least one core layer and such that the first layer of the matrix material is free of direct contact with the at least one core layer, the first layer of the matrix material including a first amount of the matrix material,
      a second of the layers of the matrix material is disposed on an outermost one of the at least two fibre layers so as to include at least a portion that is outside of an entire area between the at least two fibre layers,
      the second layer of the matrix material includes a second amount of the matrix material that is less than the first amount of the matrix material, and
      the first layer of the matrix material and the second layer of the matrix material are different types of matrix material.

17. The sandwich component of claim 16, wherein:
   the at least two fibre layers includes a third fibre layer that is the outermost one of the at least two fibre layers,
   the second fibre layer is disposed between the third fibre layer and the at least one core layer,
   a third of the layers of the matrix material is between the first fibre layer and the third fibre layer, wherein the first layer of the matrix material is between the third layer of the matrix material and the at least one core layer, and
   the third layer of the matrix material includes a third amount of the matrix material that is less than the first amount of the matrix material.

18. A sandwich component for a motor vehicle, comprising:
   a core layer;
   a plurality of fibre layers over the core layer including a first fibre layer and a second fibre layer, the first fibre layer being disposed between the second fibre layer and the core layer; and
   layers of matrix material including a first layer between one of the plurality of fibre layers and the core layer, wherein the layers of the matrix material are applied in a different amount from each other,
   wherein:
      a second of the layers of the matrix material is disposed between the first and second fibre layers and includes a first amount of the matrix material,
      a third of the layers of the matrix material is disposed on an outermost one of the plurality of fibre layers so as to include at least a portion that is outside of an entire area between the plurality of fibre layers,
      the third layer of the matrix material includes a second amount of the matrix material that is less than the first amount of the matrix material, and
      the second layer of the matrix material and the third layer of the matrix material are different types of matrix material.

19. The sandwich component of claim 18, wherein:
   the plurality of fibre layers includes a third fibre layer that is the outermost one of the plurality of fibre layers,
   the second fibre layer is disposed between the third fibre layer and the core layer,
   a fourth of the layers of the matrix material is between the second fibre layer and the third fibre layer, wherein the second layer of the matrix material is between the fourth layer of the matrix material and the core layer, and
   the fourth of the layers of the matrix material includes a third amount of the matrix material that is less than the first amount of the matrix material.

* * * * *